UNITED STATES PATENT OFFICE.

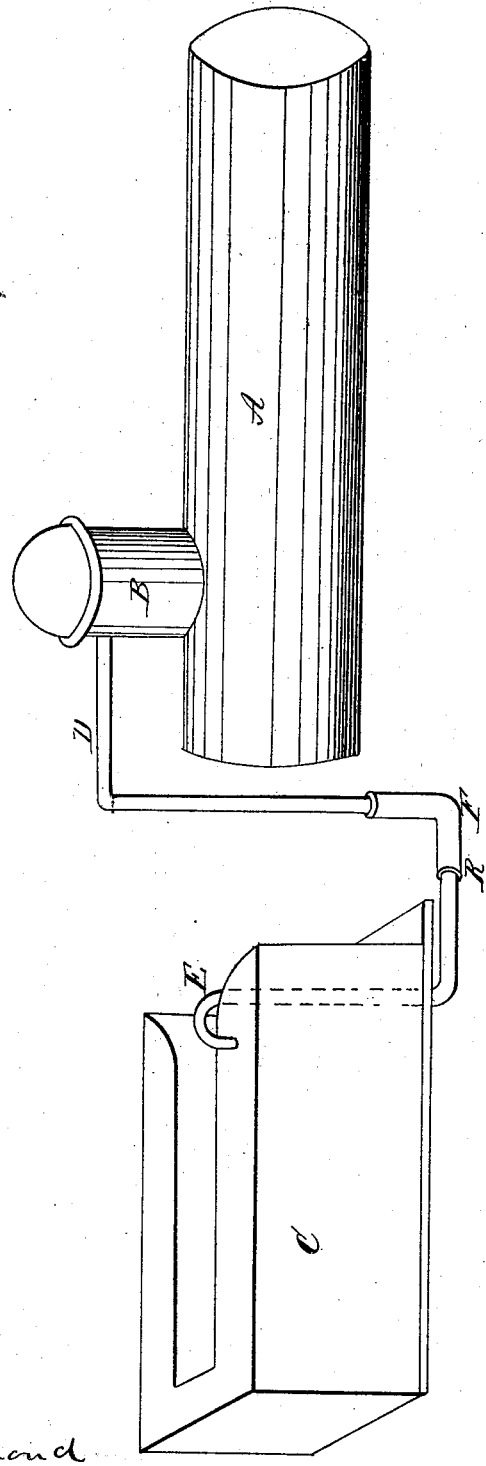

PETER C. WORTMAN, OF MEADVILLE, PENNSYLVANIA.

IMPROVEMENT IN FEED-WATER HEATERS.

Specification forming part of Letters Patent No. 93,790, dated August 17, 1869.

*To all whom it may concern:*

Be it known that I, PETER C. WORTMAN, of the city of Meadville, in the county of Crawford, State of Pennsylvania, have invented a new and Improved Device for Heating the Water in the Water-Tanks of Railroad-Locomotives with Waste-Steam; and I do hereby declare that the following is a full and exact description of the same, reference being had to the accompanying drawings, and the letters of reference marked thereon.

The object of my invention is as follows, to wit: It is a well-known fact that when a locomotive stops at a station it has to blow off the surplus steam through the safety-valve; also, when ascending a grade with high steam, when the summit is attained and the car commences to descend a down grade, the surplus steam is blown off and is all wasted, while in cold weather the water freezes in the tank. My invention is intended to use this waste-steam in heating the water in the tank.

A represents a locomotive-boiler; B, the dome of the same; C, the water-tank on the tender. D E is a tube or pipe, with a flexible joint of rubber at F.

This pipe empties into the water C at E, and through this pipe the waste-steam passes into the water-tank C, heating the water. This may be controlled by suitable stop-cocks in the pipe where the same is required.

What I claim as my invention, and desire to secure by Letters Patent of the United States, is—

The combination of the pipes D and E with the dome B and the tank C, constructed as described and set forth.

PETER C. WORTMAN.

Witnesses:
A. B. RICHMOND,
ROE REISINGER.